United States Patent [19]

Reilly

[11] 4,247,367
[45] Jan. 27, 1981

[54] APPARATUS FOR SOLID WASTE PYROLYSIS

[76] Inventor: Bertram B. Reilly, 9 Choctaw Trail, Ormond Beach, Fla. 32074

[21] Appl. No.: 95,150

[22] Filed: Nov. 16, 1979

Related U.S. Application Data

[62] Division of Ser. No. 900,983, Apr. 28, 1978.

[51] Int. Cl.$^3$ .................... C10B 47/18; C10B 7/10
[52] U.S. Cl. ............................... 202/105; 201/16; 202/82; 202/98; 202/118; 202/217
[58] Field of Search .................. 202/81, 82, 98, 105, 202/117, 118, 119, 217; 201/2.5, 13, 14, 15, 16, 21, 25, 30, 32, 33; 110/242, 342, 346

[56] References Cited

U.S. PATENT DOCUMENTS

| | | | |
|---|---|---|---|
| 2,391,566 | 12/1945 | Goodell | 202/118 X |
| 2,973,306 | 2/1961 | Chick et al. | 202/118 X |
| 3,780,676 | 12/1973 | Hazzard et al. | 110/242 X |
| 4,077,868 | 3/1978 | Chambers | 201/33 X |

FOREIGN PATENT DOCUMENTS 1307739  2/1973  United Kingdom ................ 201/15

*Primary Examiner*—Joseph Scovronek
*Attorney, Agent, or Firm*—Wm. Henry Venable

[57] ABSTRACT

This disclosure is directed to an economical system for the pyrolysis of municipal solid waste to recover valuable by-products while reducing the putrecibility and bulk of the residue requiring disposal. Prior to this treatment, the solid waste has been processed to remove most of the metallic components, and shredded, which steps are not part of the invention disclosed. The pyrolysis and by-product recovery technology is complicated by (a) the inherent variability of the chemical and physical characteristics of the shredded solid waste as received at the pyrolysis plant and (b) the relatively low heat value of said waste as thus received. This pyrolysis and product recovery system includes an improved pyrolysis retort indirectly heated principally by combustion of the least desirable by-product, the solid char, in combination with a furnace for the char combustion, a condenser for the pyrolysis vapor including means for gravity separation of the gas, liquid and solid residues entrained therein, and improved means for conveying the materials through the system including intermittently driven rams for delivering solids into the retort and furnace.

6 Claims, 13 Drawing Figures

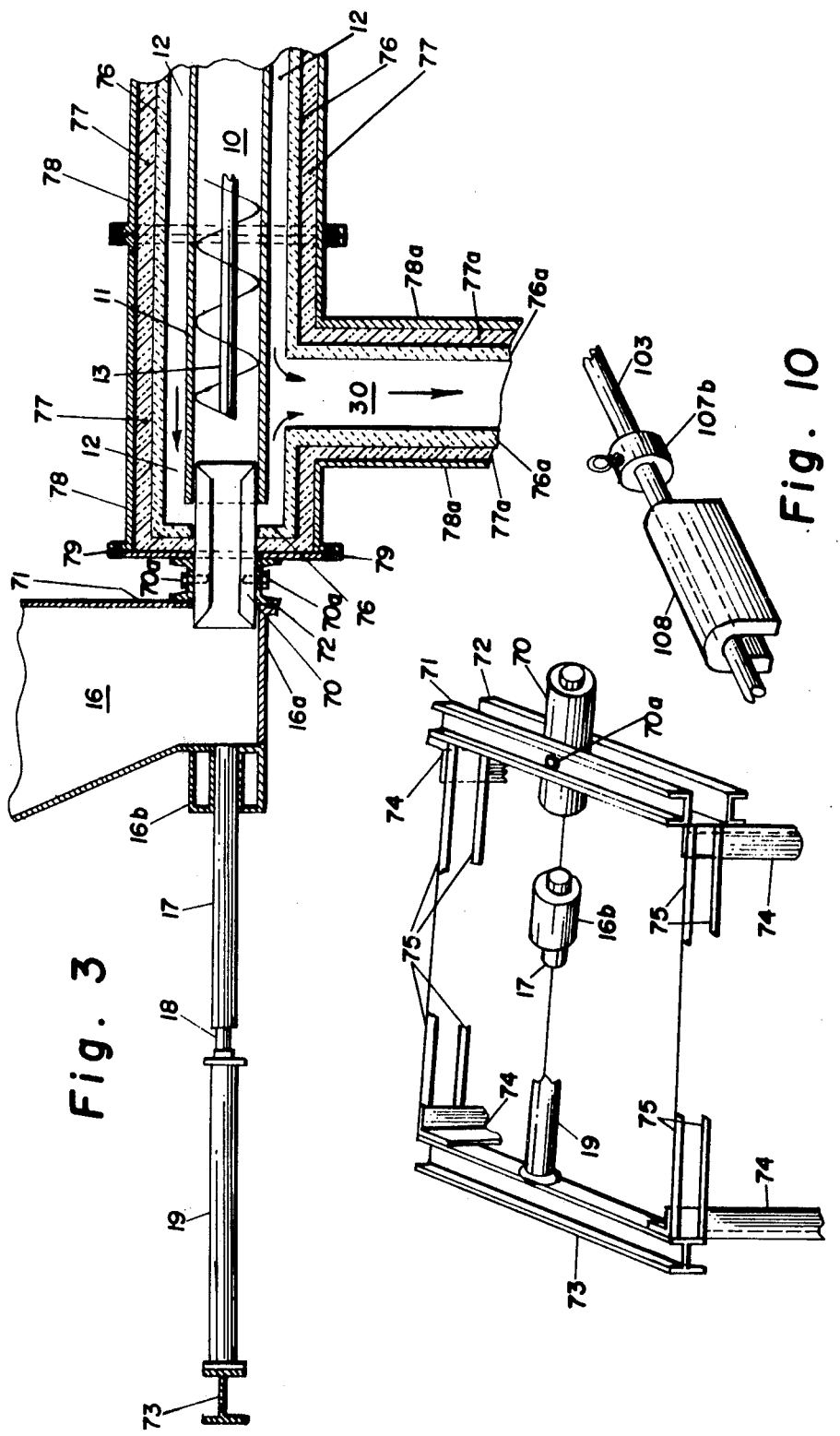

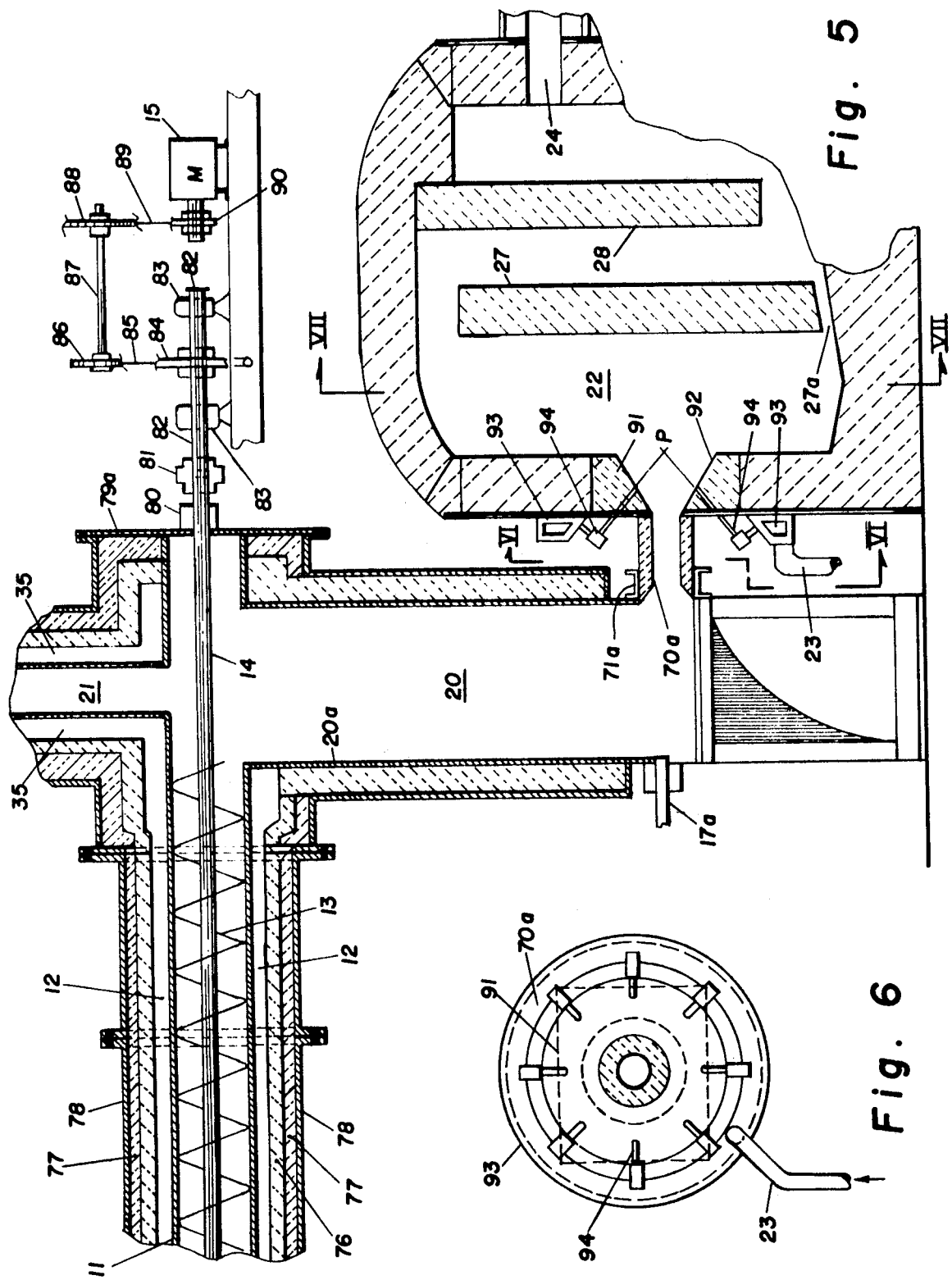

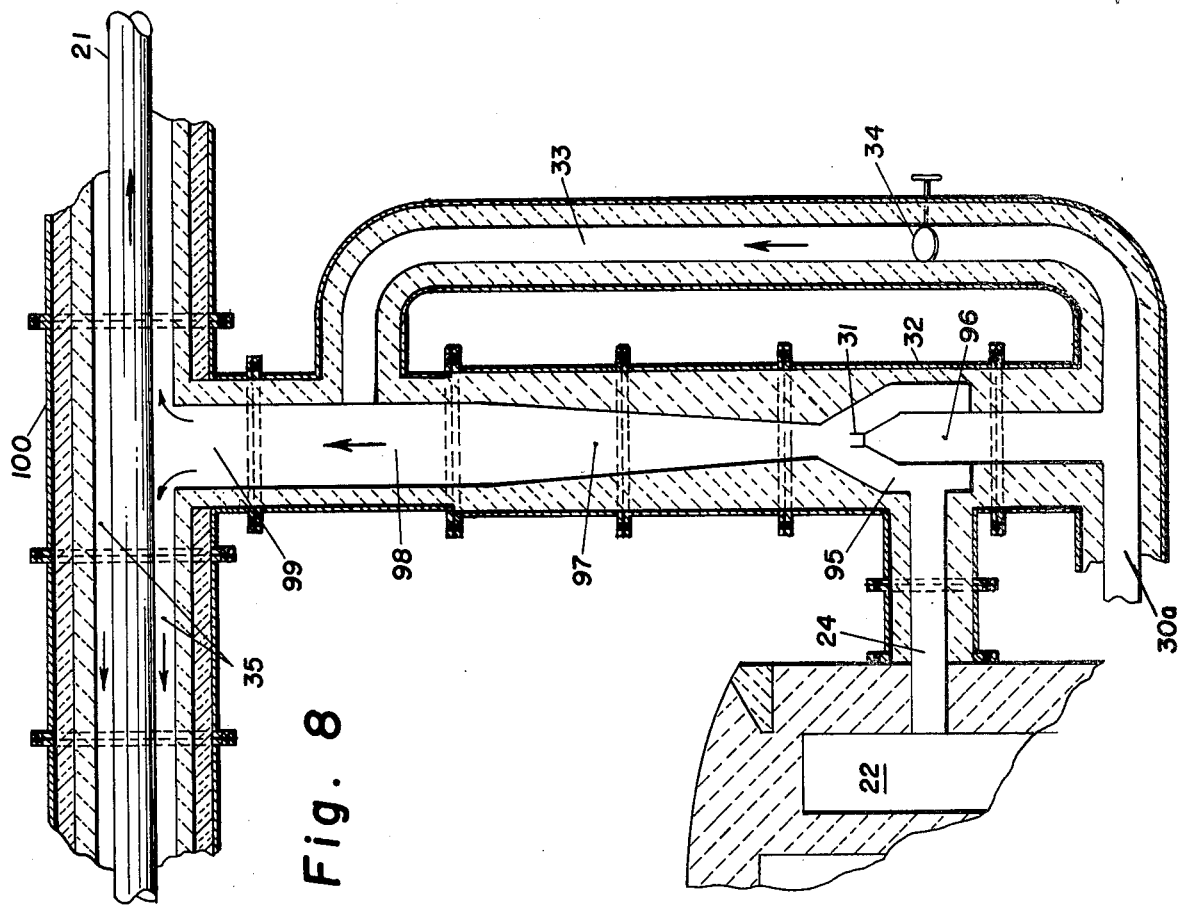
Fig. 8
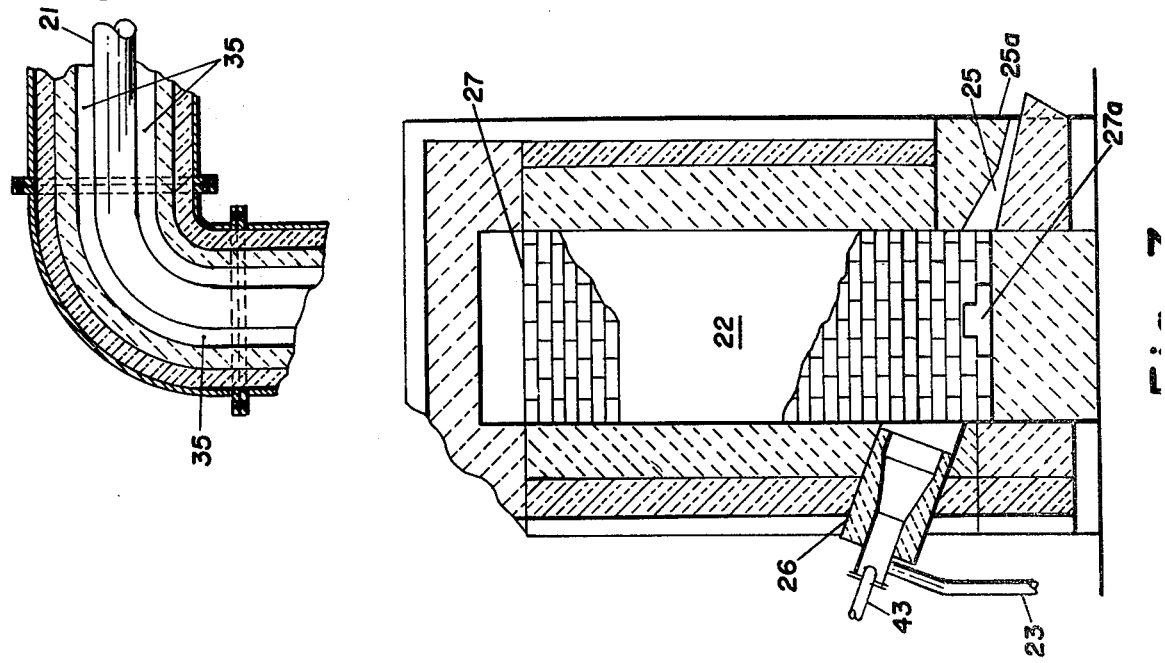

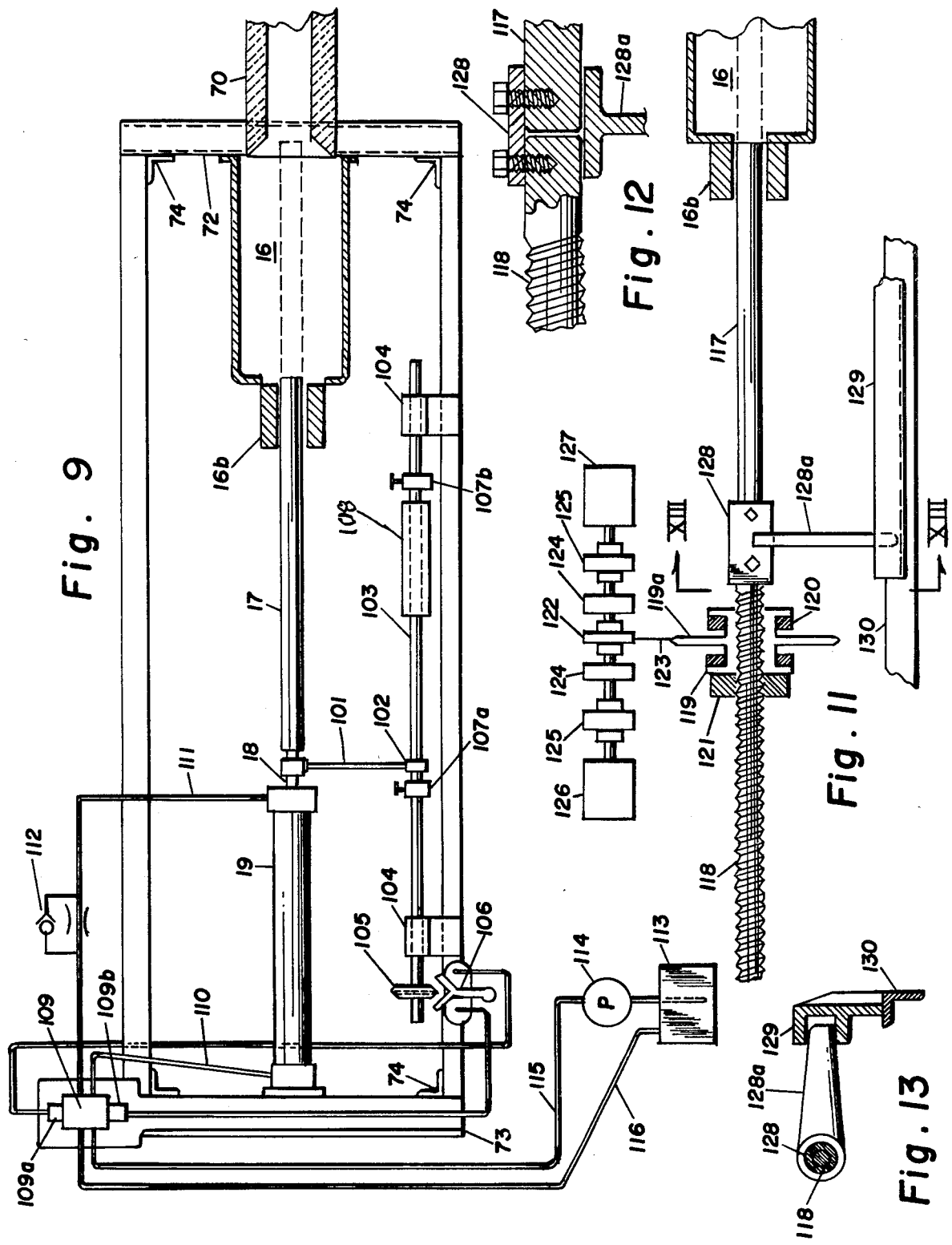

APPARATUS FOR SOLID WASTE PYROLYSIS

CROSS REFERENCE TO RELATED APPLICATION

This application is a division of my prior application Ser. No. 900,983 filed Apr. 28, 1978.

SUMMARY OF THE INVENTION

This invention relates to improvements in systems for the pyrolysis of shredded solid municipal waste in a pyrolysis retort which is indirectly heated by combustion of the char and gas pyrolysis components. The pyrolysis is effected in the absence of oxygen at a temperature producing a relatively high yield of pyrolysis oil in the vapor state, which is condensed in the system and recovered as a commercial oil product. The system includes a furnace for combustion of the char and gas at a temperature which melts the ash to liquid slag and from which the flue gas is recycled through the heating jacket of said retort.

One object of this invention is to substantially eliminate air pollution; this is accomplished (a) by provision of means for sealing the retort inlet from the shredded-waste feed hopper, (b) by the provision of an air-tight, insulated gravity char-and-fluid separator at the discharge end of the retort including means for transferring char from said separator to said furnace in sealed relation, and (c) by air-tight conduits for all flue-gas and vapors from the retort, furnace, and vapor condenser and the vent from the system to the atmosphere.

Another object is to conserve the limited heat available by combustion of the solid char and the gas pyrolysis products. This object is effected by providing refractory lining, insulation, and air-tight enclosure for said retort, said gravity-char-and-fluid-separator, and said furnace including the flue-gas recirculation elements of the system, and further by provision of means for preheating the combustion air supplied to said furnace by heat exchange with the flue-gas vented from the system, and simultaneously cooling the vented flue-gas substantially below the recirculating gas temperature. In addition, the combustion air intake is adjustably regulated to substantially eliminate excess oxygen over that needed for complete combustion, avoiding the presence of oxygen to any substantial amount in the recirculating gas.

Referring more specifically to the preferred means for sealing the retort at the shredded-waste inlet end and sealing the char-and-fluid-separator from the furnace, these are comprised of variable stroke rams injecting adjustable plugs of shredded waste (in the case of the retort) or char (in the case of the furnace) through a nozzle, said plugs forming and maintaining a seal of compressed solids substantially eliminating the flow of gas and vapor from the retort inlet or the furnace fuel inlet.

Referring more specifically to the preferred construction of the pyrolysis retort per se, the embodiment disclosed herein is comprised of a tubular jacket casing anchored at the discharge end of the retort and, at the feed end, overlapping the feed injection nozzle a short distance which axially supports the casing and permits it to slip thereon longitudinally sufficiently to compensate for the difference in the metal casing length and the overall length of the refractory-lined jacket due to thermal expansion and contraction from temperature variation. Inside said casing is a rotatable conveyor screw, also anchored at the retort discharge end by radial and thrust bearings and a packing gland shaft seal, and terminating shortly ahead of said nozzle at the feed end, at which the casing wall constitutes the screw support bearing. The spiral flights of said screw break up the sealing plugs of shredded waste leaving the nozzle, wipe the casing wall clear of an insulating layer of shredded waste and redistribute the solids in the retort as they are conveyed to the discharge end. Ending in advance of the feed nozzle, the screw is free for thermal expansion and contraction lengthwise without imposing stresses on the retort structure.

Referring more specifically to the preferred embodiment for adding furnace flue-gas to the recycling heating gas stream, this disclosure illustrates and describes a jet ejector motivated by an adjustable jet of recycling gas and connected, at the suction zone thereof, to the furnace flue. To regulate the pressure drop across the jet ejector and thereby adjust the rate of flue-gas removal from the furnace, a by-pass for a portion of the recycling gas is provided, said by-pass having therein an adjustable damper.

BRIEF DESCRIPTION OF THE DRAWINGS

FIG. 3 is a longitudinal vertical cross-section through the municipal waste inlet of the retort;

FIG. 4 is an isometric sketch of the structure supporting the ram and cylinder shown in FIG. 3;

FIG. 5 is a longitudinal vertical cross-section through the pyrolysis product discharge end of the retort, the gravity separator for the char and fluid components of said products and the char-combustion furnace; FIG. 6 is section VI—VI in FIG. 5 and FIG. 7 is a section VII—VII in FIG. 5;

FIG. 8 is a vertical cross-section through the furnace flue, the jet-ejector connected thereto, and the conduit between said jet-ejector and the pyrolysis retort;

FIG. 9 is a plan view of the instrumentation for operating the ram for injecting municipal waste into the retort and FIG. 10 is a sketch illustrating a component thereof;

FIG. 11 illustrates partly in section an alternate ram driving arrangement; FIG. 12 is a sketch in section showing the sleeve connecting the ram and drive, and FIG. 13 is section XIII—XIII in FIG. 11.

DETAILED DESCRIPTION

Pyrolysis of municipal refuse occurs through a substantial temperature range, and the relative proportions of oil and gas vary with the temperature. In systems which may be epitomized as refuse-fueled power plants embodying gas-fired steam boilers, a pyrolysis temperature of the order of 1400° F. may be selected, yielding a high ratio of gas to oil. In systems designed primarily to produce oil, which is the object of this invention, the pyrolysis temperature on the order of 1100° F. is desirable, yielding a high ratio of oil to gas. This point is noted first, before disclosure of the apparatus structure and process steps of my improved system, so that the purpose of the temperatures at various points in the system is clear.

Typically pyrolysis systems for oil production include a dryer for the shredded municipal waste, prior to delivery to a pyrolysis retort, the dryer and conveyor of hot pre-dried shredded waste being open to the atmosphere. This involves odor emission and also fire risks. With the system disclosed herein, pre-drying is eliminated and both drying and pyrolysis are accomplished in a single stage retort in the absence of oxygen.

Figure 1:
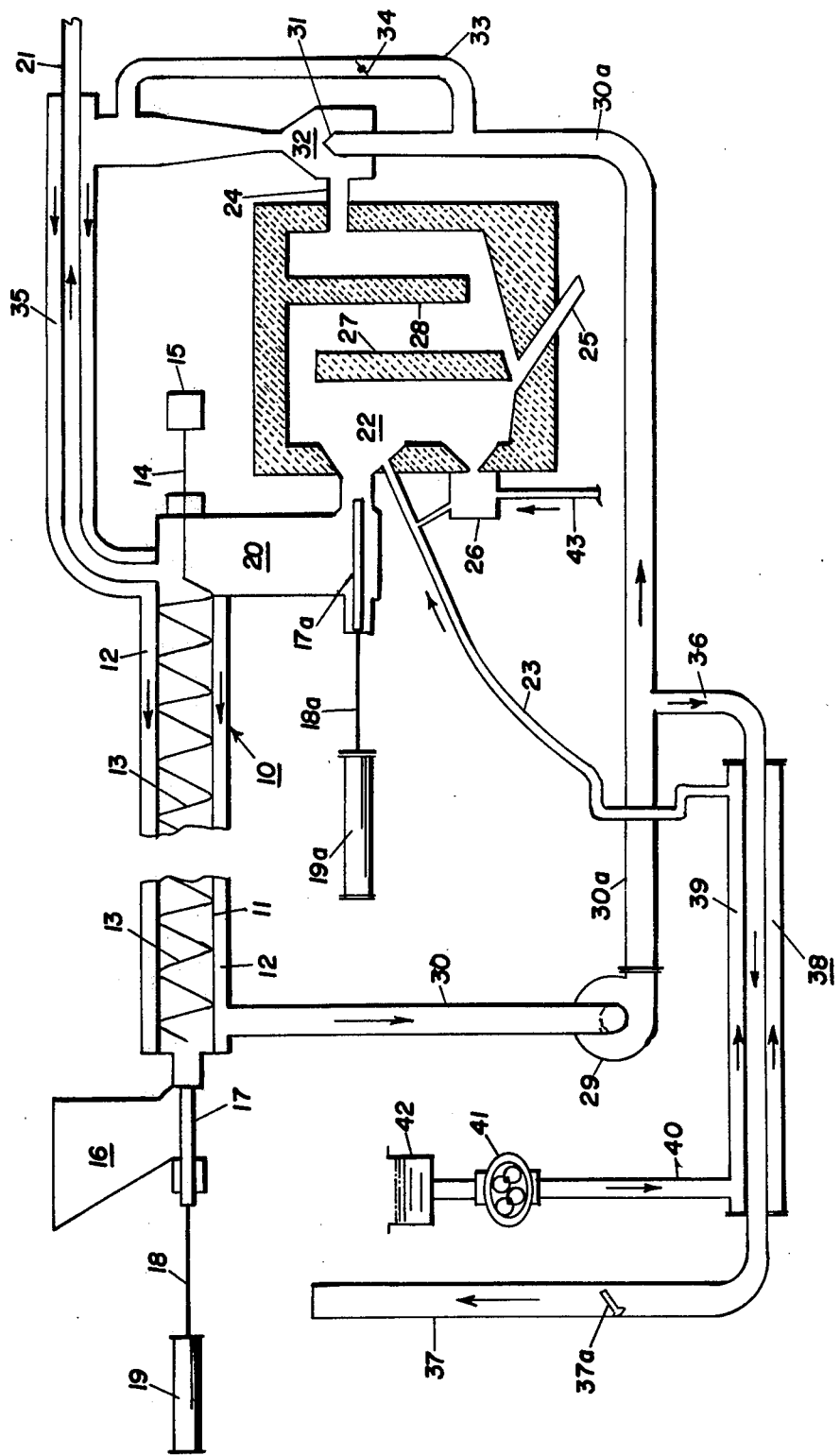
FIG. 1 is a schematic diagram of the pyrolysis retort and furnace in the system.

Referring to FIG. 1, an indirectly heated retorot 10 is shown, comprised of a tubular casing 11 within which is a spiral screw 13 for conveying the raw refuse therethrough. This casing and screw are constructed of stainless steel suitable to withstand corrosion at the temperatures necessary for pyrolysis of the refuse. The raw material feed enters the left hand end of the retort in FIG. 1 and is discharged therefrom at the right hand end. The casing 11 is surrounded by a heating jacket 12 through which hot gas is circulated as will be subsequently explained. The screw 13 is driven from beyond the delivery end by a motor 15 through a connecting shaft 14. For simplicity in this diagram, the driving transmission between the motor 15 and the shaft 14 and the journals, thrust bearings, etc. for the shaft 14 are not illustrated in FIG. 1, but it is here noted that the screw 13 is under tension, and has no shaft bearing at the feed end. The screw flights of 13 are therefore made slightly less in diameter than the casing 11, within which the screw floats.

Adjacent the feed end of the retort is shown a raw material feed hopper 16, through which, at its base, a reciprocating ram 17 passes concentric with the retort. This ram is reciprocated by a suitable driving means, the particular type illustrated in FIG. 1 being a piston rod 18 and cylinder 19 constructed to provide a variable ram stroke similar to that of the feeder disclosed in Reilly and Guy U.S. Pat. No. 3,563,398. The ram 17 thus intermittently forces a compacted plug of refuse material into the feed end of the retort 10, thus simultaneously sealing the entrance end of the retort against escape of hot vapors therefrom, and forcing the material against the flights of the screw 13. This screw 13 is driven at a rotation speed independent of the refuse feed rate by the ram 17, which speed exceeds that necessary to convey the maximum feed rate with the casing 11 full of solid particles. The screw thus breaks up the compacted refuse into loose particles and sweeps them into heating contact with the casing 11, and stirs and redistributes the particles in transit, thus preventing formation of an insulating layer thereof at the casing wall.

The retort terminates at the right hand end, in FIG. 1, at the top of char chute 20 having a gas and vapor discharge duct 21 entering the top thereof. The char, consisting typically of fixed carbon and ash, falls to the bottom of the chute 20 at which is provided a ram 17(a) similar to the ram 17 at the bottom of the feed hopper 16, and driven by piston rod 18(a) and cylinder 19(a) having a variable stroke as previously mentioned. This char chute 20 is adjacent a furnace 22, and the ram 17(a) forces the char into the furnace while simultaneously sealing the furnace entry port with compact char to prevent leakage of furnace gas therethrough. Thus the char is fed directly into the furnace 22 while it is still hot from the retort 10 without exposure to the atmosphere, avoiding smoke nuisance and conserving heat within the system. Combustion air is blown through a duct 23 to enter the furnace at the char entry port, and the char, which is above ignition temperature of its carbon content, burns as it falls towards the furnace bottom. The air is supplied through duct 23 at a rate sufficient to completely burn the char, and to maintain a temperature to melt the ash components of the char in the furnace combustion zone. The molten ash collects as slag at the furnace bottom below the char entry port, from which it is withdrawn through molten slag disposal duct 25.

For start up purposes, and to supply any additional heat necessary in case the char has insufficient heating value to maintain the furnace temperature high enough to melt the ash components of the char, a gas burner 26 may be provided, supplied combustion air through a branch of duct 23 and pyrolysis gas through pipe 43. Refractory baffles 27 and 28 are provided in the furnace to precipitate fly ash contained in the flue gas leaving the char combustion zone and collect such ash as molten slag which flows to the duct 25, through which the molten slag is tapped periodically, as well known in the art.

The hot gas circulation illustrated in FIG. 1 will next be briefly described. As previously noted, in the retort 10 the waste is heated to a pyrolysis temperature in the order of 1100° F. This is effected by a flow of heating gas which enters the retort jacket 12 at a temperature in the order of 1300° F. at the char and fluid discharge end of the retort 10 and leaves the jacket 12 at the retort feed end at approximately the 1100° F. pyrolysis temperature. This gas is recycled by fan 29 and ducts 30 and 30(a) to the nozzle 31 enclosed within jet ejector casing 32, into which, through flue port 24, flue gas at furnace temperature (e.g. 2500° F.) is drawn from the furnace and is blended with the recycled gas at the jet ejector, to produce the desired 1300° F. temperature. The jet ejector discharges this gas through jacket 35 (surrounding the duct 21) to the retort jacket. A by-pass 33 with a pressure-drop regulating damper 34 is provided to adjust the pressure drop across the jet ejector. Thus the jet ejector and the by-pass regulator function to regulate the rate of heat removal from the furnace without varying the furnace temperature. Thus the furnace can be operated at a temperature sufficiently high to melt the ash residue to a liquid slag for removal, while temperature of gas recycled is independently regulated at the lower temperature selected for indirectly heating in the pyrolysis retort.

A portion of the hot gas is withdrawn from duct 30(a) through an exhaust vent duct 36 and passes to the atmosphere through a stack pipe 37. In this transit the vent gas passes through a heat exchanger 38 having a jacket 39 in which the incoming fresh combustion air is pumped through a duct 40 and in which it is pre-heated and delivered to the duct 23 previously referred to. Suitable means is provided for balancing the pressure drop of the vent gases; for simplicity of illustration, a baffle 37(a) at the base of the stack pipe 37 is shown in FIG. 1.

Combustion air is supplied to the system by a gas pump 41 which receives air from the atmosphere through a filter 42 and delivers it to the heat exchanger 38 through the duct 40. The gas pump 41 is illustrated in FIG. 1 as a rotary positive displacement gas pump to deliver combustion air at a predetermined rate which is variable by adjusting the speed of the impellers.

It is to be understood that to prevent heat loss the components illustrated diagrammatically in FIG. 1 are all provided with insulation from the atmosphere. This insulation typically is constructed of cast refractory block sections against the hot components illustrated, surrounded by a layer of mineral fiber and an outside sheet metal casing, as well known to the art.

Figure 2:
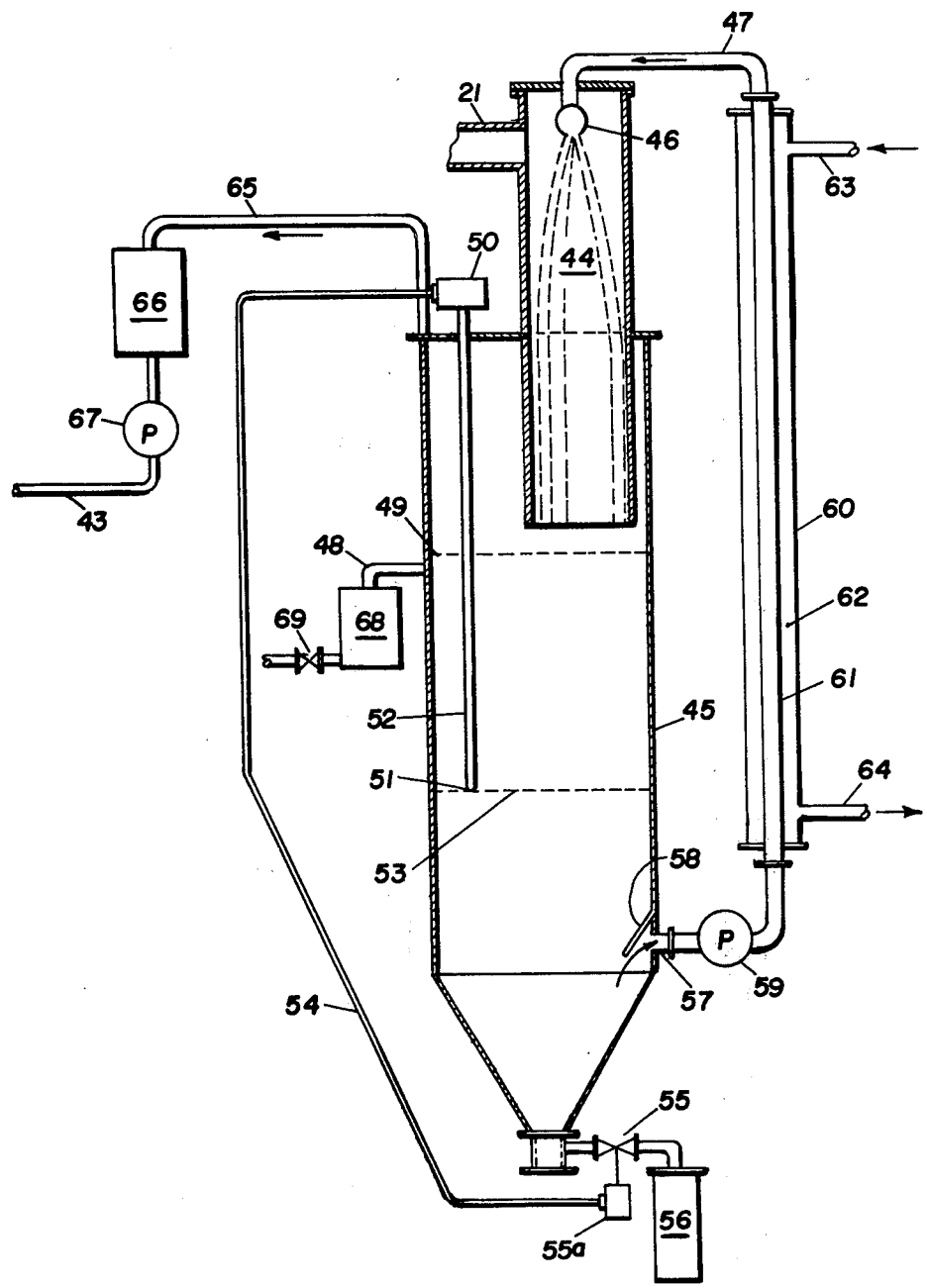
FIG. 2 is a vertical cross-section through the jet condenser and gravity separator for the gas, vapor and sludge components.

FIG. 2 illustrates diagrammatically the apparatus for separation and recovery of the gas and vapor components delivered by the duct 21 shown in FIG. 1. The duct 21 terminates at the top of a jet condenser 44 which extends downwardly into a gravity separating vessel 45. Preferably the vessel 45 has a relatively small horizontal cross-section and has substantial length providing substantial depths for the separated layers therein. The composition of the material delivered by the duct 21 consists mainly of water, pyrolysis oil, and gas, plus some solid residues from the char chute and furnace fly ash. A nozzle 46 at the top of the jet condenser 44 provides a shower of cold water supplied by pipe 47, which shower simultaneously washes the inlet gas and vapor and condenses the vapor components. These separate by gravity in the vessel 45, the gas fraction rising to the top thereof, the pyrolysis oil fraction forming a liquid layer below the gas and the water, and solid sludge settling below the oil. A liquid overflow duct 48 sets the uppermost liquid level 49, i.e. that of the separated oil. A capacitance type level controller 50 is provided to set the water-oil interface level, having a capacitance sensor 51 at the bottom thereof connected by rod 52 to the capacitance regulator at the top. This establishes an oil-water interface 53 at the sensor level, by a connecting line 54, to the motor 55(a) of a motorized valve 55 at the base of the vessel 45, opening or closing that valve to remove sludge consisting of water and solids, to a collecting vessel 56. This sludge has been substantially de-watered by gravity separation and is recycled to the feed hopper 16 for reprocessing in the retort.

At a substantially higher level where the vessel contains water and settling solids, a water outlet pipe 57 is provided shielded by an inclined baffle 58 to deflect solids away from the outlet. This water is pumped by a pump 59 through a heat exchanger 60 comprised of an inner tube 61 through which cooling water is circulated from pipe 63 at the top to pipe 64 at the bottom. The cooled water thence goes to the nozzle 46 through pipe 47 as previously noted.

The gas fraction is removed from the top of the vessel 45 through a pipe 65 and a filter 66 by means of a pump 67, and is thence returned through pipe 43 to the gas burner 26 shown in FIG. 1. The pyrolysis oil fraction overflowing through pipe 48 to a surge tank 68, from which it is periodically removed by opening valve 69.

Briefly summarizing the process results of the system as illustrated in FIGS. 1 and 2, the input consists of raw, shredded municipal waste plus the sludge recycled from the vessel 45, supplied at the feed hopper 16, and further the input consists of combustion air taken from the atmosphere by the blower 41. The net output from the system consists of (1) pyrolysis oil recovered in vessel 68, (2) the gas vented to the atmosphere through the duct 37, and (3) molten slag tapped from the furnace through duct 25. The char and gas pyrolysis components are consumed in the furnace 22 to generate the heat required for pyrolysis in retort 10 and condensation-prevention in jacket 35 of the duct 21 for gas and vapor transmission to jet condenser 44.

From the standpoint of achieving an economic heat balance, this result is effected by recycling the heating gas from the retort 10 through the jackets mentioned above, combined with the sealing of the retort and furnace by the inlet-plugging action of the rams 17 and 17(a), and with the pre-heating of combustion air by heat exchange with the vented gas in the heat exchanger 38, 39. Thus the heating value retained by the 1100° F. gas leaving the retort jacket 12 is conserved, and the relatively low B.T.U. content of the char and pyrolysis gas produced in the retort is adequate for the process except during the start-up step thereof. In some cases there may be an excess of pyrolysis gas over the amount consumed in the furnace. This excess may be used to power auxiliary operations such as the shredding of municipal waste for pyrolysis, or supplied to a gas distributing facility.

FIGS. 3 and 4 illustrate a preferred construction of the apparatus at the retort feed end of the embodiment of my invention generally shown in FIG. 1. FIG. 3 is a vertical cross-section at the center line of the retort 10 and feed hopper 16. Adjacent the rear of hopper 16 and slightly above the bottom thereof, 16(a), is attached a sleeve 16(b) through which the ram 17 slides in its forward and reverse movement. At the forward end of the feed hopper bottom 16(a), a tubular nozzle 70 extends between a pair of horizontal channels 71 and 72 through the end closure of the retort, into the end of the retort tube 11. The outside of the nozzle 70 constitutes the inlet and support for the tube 11 which does not extend all the way to the end of the jacket 12, but has a sliding fit on the outer end of the nozzle 70, to compensate for variation in the length of the tube 11 and jacket 12 due to thermal expansion and contraction of these components. The ends of the nozzle 70 taper inwardly to an inside diameter somewhat greater than the outside diameter of the ram 17, and the nozzle is retained in its position between the channels 71, 72 by bolts 70(a) through the channel webs and screwed into threaded holes in the nozzle 70 on opposite sides thereof.

The cylinder 19 is anchored at its end to the center of a horizontal H-beam 73, to which the flange of the cylinder 19 is bolted. This beam 73 is parallel to the channels 71, 72 and the beam and channels are shown in FIG. 3 supported by four posts 74, illustrated as structural steel angles. The thrust of the piston 17 forcing a slug of material into and through the nozzle 70 is countered by reaction at the center of the beam 73 and the channels 71, 72 (which together form a beam), which is transmitted to the tension members 75 connected between the ends of the beams by the top ends of the angles 74.

The details of the supporting structure illustrated particularly in FIG. 3 are disclosed only by way of example and may be varied to suit other designs; the important point is that the maximum live load produced by the feed operation is the force produced by the operation of the ram 17 in forward movement. Retraction of the ram is resisted by friction only and results in an opposite reaction at the ends of 71, 72 and 73, for which a pair of struts (not shown in FIG. 3) between the posts 74 on opposite sides, may be provided.

FIG. 3 shows the applicant's preferred construction of the retort jacket 12. The inside wall 76, spaced from the tube 11, is made of pre-cast refractory material. Around this is a layer of mineral fiber insulation 77, and the outside consists of sections of metal casing 78, which terminates at the feed end in a closure end plate 79 fastened to the adjacent flanges of channels 71 and 72 and having a central opening for the nozzle 70. At the feed end the duct 30 connects to the jacket, the inner wall being refractory blocks 76(a) surrounded by mineral fiber insulation 77(a) and encased in a metal wall 78(a).

FIG. 5 illustrates in greater detail the discharge end of the retort 10, the char chute 20, and the transfer of char from the bottom of the chute 20 into the furnace 22. The spiral flights of the retort screw 13 terminate at the entrance side wall 20(a) of the char chute but the screw shaft extends through the end plate 79(a) and a packing nut 80 to one side of a shaft coupling 81. Drive shaft 82, which corresponds in function to shaft 14 in FIG. 1, connects to the opposite side of the coupling 81. This shaft 82 is rotatably mounted on a pair of bearing blocks 83 between which a sprocket 84 is mounted. The sprocket 84 is driven by a roller chain 85 from sprocket 86 on a countershaft 87. Also mounted on the countershaft 87 is a V-belt pulley 88 driven by belt 89 from a V-belt pulley 90 on a gear motor 15. The bearings and supports for the countershaft 87 are not illustrated in FIG. 5, such structure being well known in the art.

Vapor and gas duct 21 enters the top housing of the char chute 20 and the retort jacket 12 connects to the jacket 35 surrounding the duct in that top housing, the refractory wall 76 and mineral fiber insulation 77 extending into the housing for this purpose. As illustrated in FIG. 5, this refractory and insulating material further extends adjacent the outside metal casing of the top housing of the chute, thus isolating the interior from radiation to the outside atmosphere.

The separated char at the bottom of the chute 20 is injected in slugs into the furnace 22 through a nozzle 70(a) by the intermittent thrusts of the ram 17(a) substantially as described in connection with feeding raw material to the retort. The nozzle 70(a), however, does not enter furnace like the nozzle 70 enters the retort, but abuts against the outside furnace wall at the tapered furnace inlet-opening block 91. This is a cast refractory block having a tapered opening 92 therethrough, the diameter of which at the inlet side corresponds to the inside diameter of the nozzle 70(a). On the outside furnace wall, and centered about the axis of the tapered opening 92, is mounted a circular hot air distributing duct 93, from which a plurality of air injection pipes 94 extend (generally radially inward as viewed in FIG. 6) and project through the block 91 to the face of the tapered opening 92. The orientation of the pipes 94 through the block 91 directs jets of air towards the point P in FIG. 5, at the inside furnace wall and on the axis of the tapered opening 92. These jets strike and mix with the entering hot char, facilitating the prompt burning thereof. Hot air is supplied under pressure to the circular duct 93 by pipe 23, as described previously with reference to FIG. 1.

In FIG. 1, the auxiliary gas burner 26 is shown on the same side of the furnace 22 as the char combustion inlet. This was partly for simplicity of illustration diagrammatically, but it may be noted that this arrangement is optional, and does not appear in FIG. 5. In that embodiment of this invention the auxiliary gas burner is mounted on an adjacent side of the furnace 22, at approximately the center of the combustion zone, as illustrated in FIG. 7 which is a vertical cross-section taken at the combustion zone center. The molten slag duct 25 in this embodiment is provided on the opposite side of the furnace and the gas burner is directed downwardly towards the entrance of the duct 25 to insure that the ash is melted to liquid slag for tapping through the duct 25.

FIG. 7 is viewed in a direction facing the furnace baffle 27 there illustrated as constructed of refractory brick. An opening 27(a) adjacent the furnace floor is shown in FIGS. 5 and 7 for flow of slag from the furnace behind the baffle 27, the furnace floor being downwardly inclined towards the center of the combustion zone as illustrated in FIG. 5 to facilitate flow towards the duct 25. In FIG. 7, this duct is shown as formed in a pre-cast refractory tap-out block 25(a), the gas burner 26 is similarly formed of a pre-cast refractory block with a gas nozzle within a combustion air casing mounted thereon, and supplied respectively, with pyrolysis gas and combustion air by the ducts 43 and 23 as explained heretofore.

FIG. 8 illustrates a preferred construction of the apparatus provided for hot gas circulation from the furnace 22 to jacket 12 of the retort 10, as generally disclosed with reference to FIG. 1. Hot gas from the furnace through the duct 24 enters the ejector 32 near the bottom of the lower cylindrical section of the nozzle housing 95. Above the cylindrical section of 95 is a frustro-conical top section. Nozzle pipe 96 extends axially through the cylindrical section of housing 95, terminated by a nozzle 31 within the frustro-conical section, and ejects therein a jet of hot air delivered from the retort jacket 12 by the fan 29 (see FIG. 1) through duct 30(a), which duct connects to the nozzle pipe 96. Above the bottom housing 95 is shown an expansion section 97, tapering from the small diameter bottom inlet to a larger diameter top outlet. This ejector construction, as well known in the art, sucks hot gas from the furnace and delivers that hot gas through duct 98 to the entrance opening 99 of the housing section 100 enclosing the gas-vapor duct 21 at the end of the jacket 35, thus delivering the heated gas to that jacket 35. As previously explained, this jacket 35 delivers that heated gas to jacket 12 of the retort 10. To regulate the pressure drop between the ejector nozzle 31 and the outlet of the expansion section 97, a by-pass 33 is provided, having a damper 34 therein to throttle the flow through 33.

The ejector housing 96 and the expansion nozzle 97 are constructed of pre-cast refractory blocks and have mineral fiber insulation adjacent the metal outside sheet metal casing, as heretofore mentioned with reference to FIG. 1.

Instrumentation for controlling the variable stroke of a ram 17 reciprocated by a cylinder 19 is diagrammatically illustrated in FIG. 9. An arm 101 extends laterally from the piston rod 18, which arm terminates in a collar 102. This collar 102 loosely surrounds a shift-shaft 103, which is shiftably supported by slide guides 104 mounted on the support framework. To one end of the shift-shaft 103 is attached a tapered collar 105, the tapered rim of which is in registry with the yoke of the reversing arm of a rotary pilot valve 106. Between the slide guides 104 a pair of spaced-apart collars 107(a) and 107(b) are adjustably secured; the former, 107(a) being shifted directly by the collar 102 of the arm 101 on the reverse stroke of the ram, and the latter, 107(b), being shifted by one end of a spacer 108 on the forward ram stroke when the collar 102 engages the opposite end.

The spacer 108 may be yoke shaped in cross-section as shown in FIG. 10 and a supply of several of these of different length are stocked for selection to place on the shift-shaft 103 between the collars 102 and 107(b). It is apparent from FIG. 9 that, since the result of shifting shaft 103 by collar 107(b) reverses the pilot valve 106 on the forward stroke of the ram 17, that the difference between the spacing of the collars 107(a) and 107(b) and the length of the selected spacer 108 determines the forward thrust distance of the ram 17. For the maximum ram stroke, no spacer 108 is placed on the shift-shaft, and the collar 102 contacts the collar 107(b) directly at the end of the stroke.

Reversal of pilot valve 106 effects reversal of a pilot-operated valve 109, the pilot operating cylinders 109(a) and 109(b) of which are connected to the rotary pilot valve as diagrammatically illustrated in FIG. 9. These valves are commercial items and it is unnecessary here to describe their internal structures, it being sufficient to note that shifting of the collar 105 to the right as seen in FIG. 9 operates the valve 109 at the end of the forward stroke, terminating oil flow under pressure through pipe 110 to rear end of the cylinder 19 and delivering it through pipe 111 to the forward end thereof to initiate retraction of the ram 17. A flow control valve 112 is shown in the pipe 111 to meter the rate of ram retraction to a desired, predetermined, speed. Hydraulic oil supplied from reservoir 113 is delivered to the valve 109 by pump 114 and conduit 115, and returned to the reservoir by conduit 116. Similar means, not illustrated in FIG. 9, supply oil at suitable pressure to the rotary pilot valve 106. In lieu of hydraulic piloting, as well known in the art, other controls may be substituted such as electrically operated pilot and reversing valves, and a reversing electrical limit switch reversed by the collar 105.

This invention is not limited to hydraulic cylinder operation of the ram, however; suitable mechanical drives, such as rack-and-pinion, eccentric cam, worm-screw, etc., may be alternately used. The applicant has designed and tested a worm-screw ram drive and one such arrangement is schematically illustrated in FIGS. 11, 12 and 13, which will next be described.

FIG. 11 is a plan view of this device, in which the sleeve 16(b) and adjacent hopper side wall and the ram driving worm-screw and nut structure are shown in cross-section. The ram, item 117 in FIG. 10, connects to the forward end of a driving worm-screw 118 by a coupling sleeve 128 (see FIG. 12) from which a stabilizing bar 128(a) extends laterally. The end of the bar 128(a) glides between the flanges of a channel bar 129 supported parallel to the ram and screw on the supporting frame member 130 (see FIG. 13). The worm-screw 118, thus held from rotating, is propelled by a nut and sprocket structure 119, rotatably supported by a pair of rotary and thrust bearings 120 and further by a thrust bearing 121 which carries the burden of thrust on the forward ram stroke. The outer races of these bearings are mounted in a fixed position on the supporting framework, a detail not shown in the drawings for simplicity of illustration. The nut 119 is threaded axially to engage the threads of the worm-screw 118 and has a sprocket portion 119(a) driven from an adjacent sprocket 112 through a chain 123. In FIG. 11 the sprocket 122 is shown mounted at the center of a shaft rotatably supported on bearings 124 and terminating at each end in clutches 125. Hydraulic motors 126 and 127, rotating in opposite directions, are selectably connected by operation of the clutches 125, disconnecting one motor and connecting the other simultaneously. The hydraulic motor 126 turns the nut 119 in the direction to propel the ram 117 forward; 127 turns it in the direction to retract the ram. Since less power is required to retract the ram than to propel it forwardly, the motor 127 need not be as powerful as motor 126, and 127 is preferably instrumented to rotate at a constant, predetermined speed, not illustrated in the drawings as such instrumentation is well known in the art.

Also, for simplicity of illustration, mechanism for shifting the clutches 125 is not included in FIG. 11. It is deemed obvious to the reader that, for example, the arm 128(a) may be provided with a collar similar to item 102 in FIG. 8, slideable on a shaft similar to item 103, and that a valve similar to item 106 may be connected to opposite ends of an auxiliary hydraulic cylinder the piston of which throws the clutches 125 simultaneously by suitable mechanical connections thereto.

In the foregoing specifications and the following claims, the word "screw" (item 13) is to be construed in the broad connotation as used in the material conveying art, comprehending screw conveyors having a variety of flight constructions such as helicoid, cut flights, paddles, ribbon flights, etc., which may be varied if desired in different zones of the pyrolysis retort. Also, the word "furnace" (item 22) comprehends a variety of well known constructions, such as, for example, cyclone furnaces, without limitation to the rectangular structure specifically described and ilustrated.

I claim:

1. A municipal waste pyrolysis system for the production of pyrolysis oil comprised of a pyrolysis retort having a jacket for indirectly heating said retort, char-recovering means directly connected at its top to the discharge outlet of said retort to separate by gravity the solid char component of the pyrolysis products discharged therein from the fluid pyrolysis products, a furnace fueled by said char component having a char inlet directly connected to said char-recovering means adjacent the bottom thereof, means for injecting said char component through said inlet into said furnace in sealing relation to said char-recovering means, a jet condenser for said fluid pyrolyis products combined with a gravity separating vessel for recovering the pyrolysis oil and gas fractions thereof, a fluid-component conduit between the top of said char-recovering means and said jet condenser, vented means for recycling heating gas through said retort jacket from the pyrolyzed product discharge end of said retort to the municipal waste feed end thereof, and means for injecting the flue gas from said furnace into the recycled heating gas stream returning from the waste inlet end of said jacket thereby restoring said stream to the temperature for return to the pyrolysis product discharge end of said retort jacket.

2. The combination set forth in claim 1 in which a supplementary gas burner is mounted on one side of said furnace, a downwardly inclined outlet duct for molten slag is constructed through the refractory floor of said furnace, and means for delivering pyrolysis gas to said gas burner from said gravity separating vessel at a controlled rate to maintain the furnace temperature sufficient to melt the ash from combustion of the char to a liquid slag drained from said furnace through said downwardly inclined outlet duct.

3. The combination set forth in claim 1 in which said fluid-component conduit has a jacket for indirectly heating said fluid components and is constructed and arranged such that said conduit jacket conducts recycled heating gas into which flue gas has been injected to said retort jacket and simultaneously maintains said conduit at a temperature preventing vapor condensation therein.

4. The combination set forth in claim 1 further characterized in that said means for injecting furnace flue gas into said recycled gas stream is comprised of a jet-ejector casing, a nozzle within the taper of said jet-ejector casing and an expansion section forward of the taper of said casing, a flue-gas duct from said furnace into said casing, said nozzle being connected to the recycled gas stream to discharge a jet of recycled gas into said casing whereby flue gas is withdrawn from said furnace through said duct and combined with the recycled heating gas from said jet, and a by-pass duct around said jet-ejector, said by-pass duct having an adjustable baffle therein to regulate the pressure drop across said jet-ejector and adjust the rate of heat removed from said furnace without varying the furnace temperature.

5. A municipal waste pyrolysis system for the production of pyrolysis oil comprised of a pyrolysis retort having a jacket for indirectly heating said retort, a furnace for combustion of the char component of the pyrolysis products discharged from said retort, a condenser for the fluid products of said retort, a gravity separator connected to said condenser for separating and recovering the gas, oil, water and sludge pyrolysis components discharged from said retort, means for indirectly heating said retort by recycling heating gas through said jacket, and means for injecting flue gas from said furnace into said heating gas to maintain the pyrolyzing temperature of said retort, a vent to the atmosphere for a portion of said recirculated heating gas balancing the added flue gas from said furnace, means for delivering combustion air to said furnace and means for pre-heating said combustion air by indirect countercurrent heat exchange with the heating gas in passage to said vent.

6. A municipal waste pyrolysis system as set forth in claim 5 further characterized in that said means for recycling heating gas is comprised of a heating-gas recycling fan, a suction duct connecting the suction inlet of said fan to the jacket of said retort at the municipal waste feed end of said retort and a gas return duct connecting the outlet from said fan to said means for injecting furnace flue gas into the recycling gas flow; said means for delivering combustion air to said furnace being comprised of a blower connected to the atmosphere on the suction side thereof, a conduit from the discharge side of said blower to the air flow portion of said means for pre-heating combustion air and a conduit from said air-flow portion to said furnace, and a heating gas conduit connected between said gas return duct and the heating-air-flow portion of said means for pre-heating said combustion air.

* * * * *